United States Patent
Clarkson et al.

(10) Patent No.: US 10,837,313 B2
(45) Date of Patent: Nov. 17, 2020

(54) GAS TURBINE ENGINES WITH HEATED CASES

(71) Applicant: United Technologies Corporation, Farmington, CT (US)

(72) Inventors: Steven Clarkson, Cheshire, CT (US); Daniel K. Van Ness, II, Middletown, CT (US); Paul Thomas Rembish, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 897 days.

(21) Appl. No.: 14/969,719

(22) Filed: Dec. 15, 2015

(65) Prior Publication Data

US 2016/0169036 A1 Jun. 16, 2016

Related U.S. Application Data

(60) Provisional application No. 62/091,953, filed on Dec. 15, 2014.

(51) Int. Cl.
*F01D 25/10* (2006.01)
*F01D 25/18* (2006.01)
(Continued)

(52) U.S. Cl.
CPC ............ *F01D 25/10* (2013.01); *F01D 17/105* (2013.01); *F01D 25/02* (2013.01); *F01D 25/12* (2013.01);
(Continued)

(58) Field of Classification Search
CPC ........ F01D 25/10; F01D 25/12; F01D 25/125; F01D 25/14; F01D 25/02; F01D 17/105; F01D 25/24; F01D 25/18; F04D 27/009; F04D 27/0215; F04D 29/522; F04D 29/584; F04D 29/5853; F02C 6/08; F02C 7/18; F02C 9/18; F02C 7/047; F02C 7/14; F05D 2260/20
See application file for complete search history.

(56) References Cited

U.S. PATENT DOCUMENTS

| | | | | |
|---|---|---|---|---|
| 4,463,552 | A | * | 8/1984 | Monhardt ............... F01D 25/32 60/226.1 |
| 4,546,605 | A | * | 10/1985 | Mortimer .............. F01D 17/105 184/6.11 |

(Continued)

FOREIGN PATENT DOCUMENTS

| | | |
|---|---|---|
| EP | 1531236 A2 | 5/2005 |
| EP | 2431590 A2 | 3/2012 |
| WO | 2014088671 A2 | 6/2014 |

OTHER PUBLICATIONS

European Search Report for Application No. 15200195.4-1607; dated May 10, 2016; 7 pgs.

*Primary Examiner* — Christopher Verdier
(74) *Attorney, Agent, or Firm* — Cantor Colburn LLP

(57) ABSTRACT

A case for a gas turbine engine includes a case body defining an axially extending core flow path, a radially extending bleed air duct coupling the core flow path in fluid communication with the external environment, and a structure-supporting member spanning the bleed air duct. A lubricant conduit is connected to the case body and is in thermal communication with the structure-supporting member.

13 Claims, 6 Drawing Sheets

(51) Int. Cl.
*F01D 25/24* (2006.01)
*F01D 25/02* (2006.01)
*F01D 17/10* (2006.01)
*F02C 7/047* (2006.01)
*F02C 9/18* (2006.01)
*F04D 27/02* (2006.01)
*F04D 29/58* (2006.01)
*F04D 29/52* (2006.01)
*F01D 25/12* (2006.01)
*F01D 25/14* (2006.01)
*F02C 7/14* (2006.01)
*F02C 6/08* (2006.01)

(52) U.S. Cl.
CPC ............ *F01D 25/125* (2013.01); *F01D 25/14* (2013.01); *F01D 25/18* (2013.01); *F01D 25/24* (2013.01); *F02C 7/047* (2013.01); *F02C 7/14* (2013.01); *F02C 9/18* (2013.01); *F04D 27/0215* (2013.01); *F04D 29/522* (2013.01); *F04D 29/584* (2013.01); *F04D 29/5853* (2013.01); *F02C 6/08* (2013.01); *F05D 2220/32* (2013.01); *F05D 2260/20* (2013.01); *F05D 2260/4031* (2013.01); *Y02T 50/60* (2013.01)

(56) References Cited

U.S. PATENT DOCUMENTS

| | | | |
|---|---|---|---|
| 4,844,689 A * | 7/1989 | Seed | F01D 9/041 |
| | | | 415/169.1 |
| 9,896,964 B2 * | 2/2018 | Clarkson | F04D 27/0215 |
| 2012/0070271 A1* | 3/2012 | Urban | F02C 6/08 |
| | | | 415/145 |
| 2014/0245747 A1* | 9/2014 | Pritchard, Jr. | F01D 17/105 |
| | | | 60/782 |

* cited by examiner

GAS TURBINE ENGINES WITH HEATED CASES

CROSS REFERENCE TO RELATED APPLICATIONS

This application claims the benefit of U.S. Provisional Patent Application Ser. No. 62/091,953 filed on Dec. 15, 2014 the entire contents of which are incorporated herein by reference thereto.

BACKGROUND

1. Field of the Disclosure

The present disclosure relates to gas turbine engines, and more particularly to heated gas turbine cases housing rotating engine components.

2. Description of Related Art

Gas turbine engines commonly include a compressor section with two or more compressor stages ordinarily sealed from the external environment. Under certain circumstances, it can become necessary to bleed compressed air from the compressor section to the external environment, typically through bleed air ducts defined through the case housing the compressor section. This can be necessary to match or re-match airflow through the compressor section stages. Bleeding compressor airflow can also allow foreign material ingested by the compressor section, such as rain, ice, or hail, to be extracted from air traversing the compressor stages.

Bleed air ducts are typically arranged about an annulus defined by the engine case. Structural load carrying elements spanning the annulus commonly partition the annulus into circumferentially adjacent bleed air ducts. Valves coupled to the bleed air ducts selectively place the core interior in fluid communication with the external environment for bleeding airflow from the compressor section. Under certain operational conditions the structural elements can collect foreign material extracted from the core flow path, potentially blocking the bleed air duct and/or rejecting (returning) the foreign material to the compressor interior.

Such conventional methods and systems have generally been considered satisfactory for their intended purpose. However, there is still a need in the art for improved gas turbine engine cases. The present disclosure provides a solution for this need.

SUMMARY OF THE DISCLOSURE

A case for a gas turbine engine includes a case body defining an axially extending core flow path, a radially extending bleed air duct coupling the core flow path in fluid communication with the external environment, and a structure-supporting member spanning the bleed air duct. A lubricant conduit is connected to the case body and is in thermal communication with the structure-supporting member.

In certain embodiments, the lubricant conduit can be in fluid communication with a source of heated lubricant. The heated lubricant source can be a lubricated engine component, such as fan gear drive architecture, bearing system, or any other suitable component encased within the case body of the gas turbine engine. It is contemplated that the lubricant conduit can receive heated lubricant from the heated lubricant source, transfer heated lubricant received from the heated lubricant source, and return cooled lubricant to the heated lubricant source.

In accordance with certain embodiments, the bleed air duct can be an annulus dividing the case body into a case body forward segment and a case body aft segment. One or more case body structure-supporting members can axially span the annulus and couple the forward segment to the aft segment. The structure-supporting member can divide the annulus into a plurality of circumferentially adjacent bleed air ducts. The structure-supporting member can also have a structure-supporting member surface facing the core flow path for dividing flow from the core flow path into separate bleed air duct flows.

It is also contemplated that, in accordance with certain embodiments, the lubricant conduit can be in thermal communication with the structure-supporting member through an intervening portion of the case body aft segment. The lubricant conduit can be defined within the case body aft segment, and can include a manifold or capillary-like structure integrally cast within a wall of the case body. It is also contemplated that lubricant conduit can be coupled to an exterior surface of the case body aft segment, such as aftwards and radially outwards relative to an engine rotation axis defined within the case body.

A gas turbine engine includes a lubricated engine component, a case body encasing the lubricated engine component, and a lubricant conduit coupling the lubricated engine component and the case body in fluid communication with one another. The case body is as described above. The lubricant conduit is connected to the case body and is in thermal communication with the structure-supporting member through the case body for heating a core flow path-facing surface of the structure-supporting member.

A method of heating a gas turbine engine core case includes receiving a flow of heated lubricant, transferring heat from the heated lubricant flow into the core case, and further transferring heat from the core case into a structure-supporting member coupling forward and aft segments of the case body to one another. The method further includes heating a core flow path-facing surface of the structure-supporting member for removing heat while operating the gas turbine engine in both icing conditions and non-icing operating conditions.

In embodiments, receiving the flow of heated lubricant can include receiving heated lubricant from a lubricated engine component. The method can further include returning cooled lubricant to the lubricated engine component. Heating the core flow path-facing surface can further include heating the surface continuously during both icing and non-icing operating conditions.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE EMBODIMENTS

Figure 1:
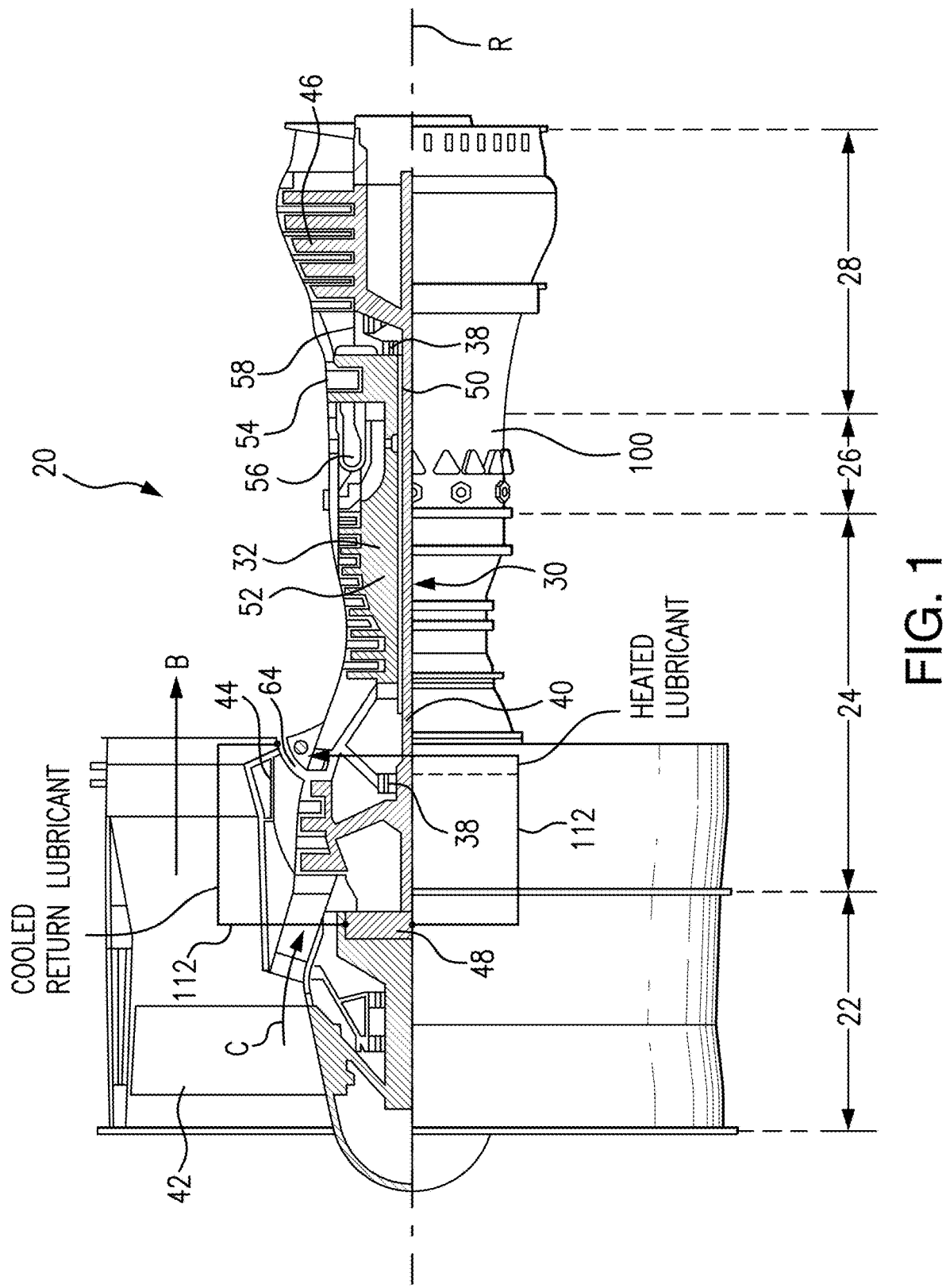
FIG. 1 is a schematic partial cross-sectional view of an exemplary embodiment of a gas turbine engine constructed in accordance with the present disclosure, showing a lubricant conduit coupled in fluid communication with a lubricated engine component.

Reference will now be made to the drawings wherein like reference numerals identify similar structural features or aspects of the subject disclosure. For purposes of explanation and illustration, and not limitation, a partial view of an exemplary embodiment of a core case in accordance with the disclosure is shown in FIG. 1 and is designated generally by reference character 100. Other embodiments of core cases in accordance with the disclosure, or aspects thereof, are provided in FIGS. 2-5, as will be described. The systems and methods described herein can be used for gas turbine engines, such as aircraft main engines.

FIG. 1 schematically shows a gas turbine engine 20. Gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. Although depicted as a geared turbofan gas turbine engine in the disclosed non-limiting embodiment, it should be understood that the concepts described herein are not limited to use with geared turbofans as the teachings may be applied to other types of turbine engines including three-spool, or geared, turbofan, turboshaft, or turboprop architectures.

Fan section 22 drives air along a bypass flow path B while compressor section 24 drives air along a core flow path C for compression and communication into the combustor section 26 and expansion through turbine section 28. Gas turbine engine 20 generally includes a low speed spool 30 and a high speed spool 32 mounted for rotation about an engine rotation axis R relative to an engine core case 100 via several bearing systems 38. It should be understood that various bearing systems 38 at various locations may alternatively or additionally be provided.

Low speed spool 30 generally includes an inner shaft 40 that interconnects a fan 42, a low pressure compressor 44 and a low pressure turbine 46. Inner shaft 40 is connected to fan 42 through fan drive gear architecture 48 to drive the fan 42 at a lower speed than low speed spool 30. Fan drive gear architecture 48 connects the low pressure compressor 44 to fan 42, but allows for rotation of low pressure compressor 44 at a different speed and/or direction than fan 42.

High speed spool 32 includes an outer shaft 50 that interconnects a high pressure compressor 52 and a high pressure turbine 54. A combustor 56 is arranged between high pressure compressor 52 and the high pressure turbine 54. A mid-turbine frame 58 disposed with engine core case 100 is arranged generally between the high pressure turbine 54 and the low pressure turbine 46. The mid-turbine frame 58 further supports bearing systems 38 in turbine section 28.

Inner shaft 40 and outer shaft 50 are concentric and rotate via bearing systems 38 about the engine rotation axis R that is collinear with their respective longitudinal axes. The core airflow is compressed by low pressure compressor 44 then high pressure compressor 52, mixed and burned with fuel in the combustor 56, then expanded over the high pressure turbine 54 and low pressure turbine 46. High pressure turbine 54 and low pressure turbine 46 rotationally drive the respective low speed spool 30 and high speed spool 32 in response to the expansion.

Figure 2:
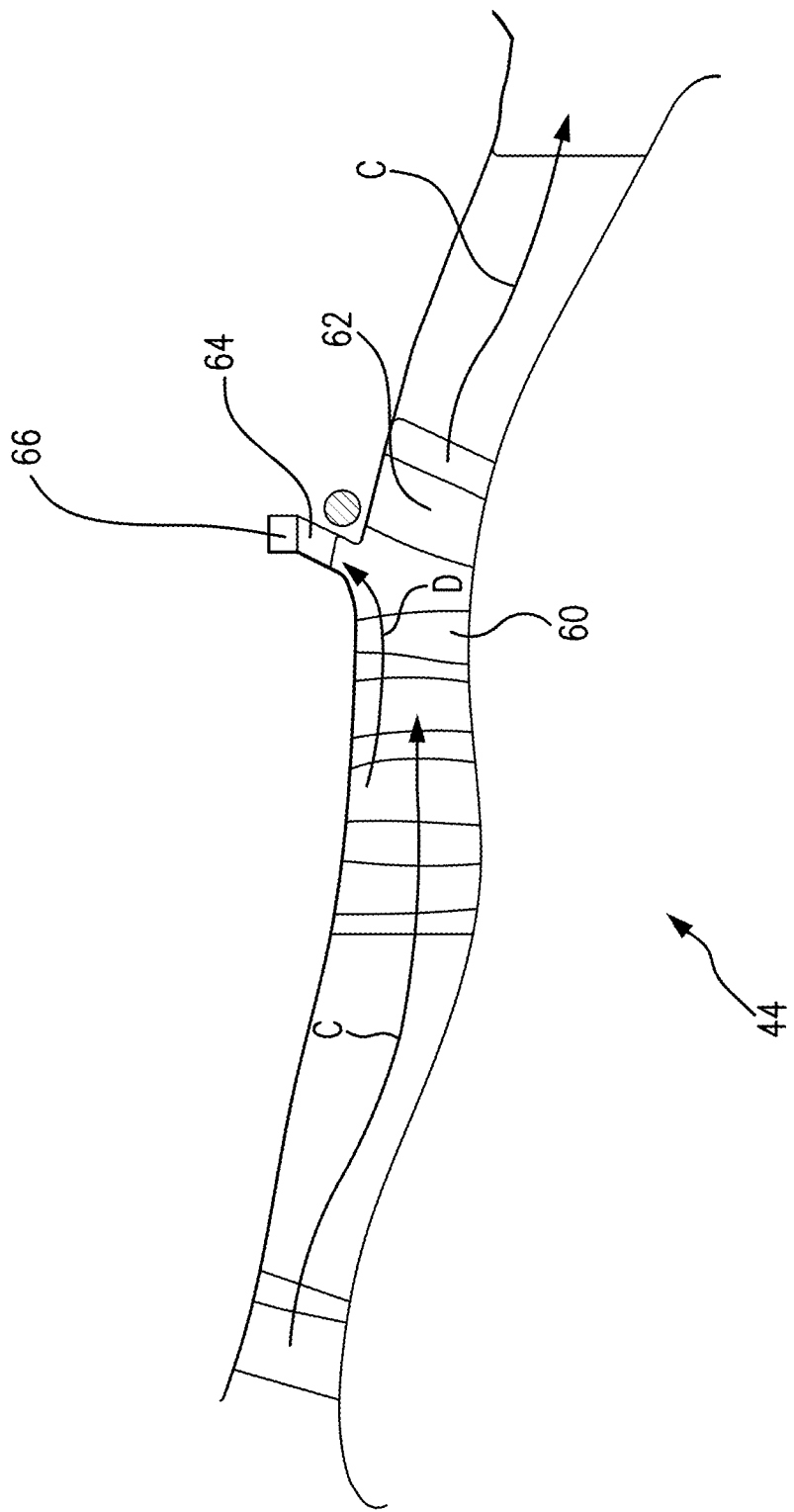
FIG. 2 is a cross-sectional view of a portion the gas turbine engine of FIG. 1, showing a bleed air duct defined by the gas turbine engine case.

With reference to FIG. 2, a portion of low pressure compressor 44 is shown. Low pressure compressor 44 includes a rotor stage 60 and a stator stage 62 housed within engine core case 100. Rotor stage 60 is forward of stator stage 62 and upstream relative to core airflow C. Engine core case 100 defines a bleed air duct 64 between rotor stage 60 and stator stage 62. Bleed air duct 64 extends radially outward relative core flow path C and engine rotation axis R. A valve assembly 66 is connected to bleed air duct 64 on a radially outer end of bleed air duct 64 that is configured and adapted to bleed air from between rotor stage 60 and stator stage 62 under predetermined conditions, such as matching airflow through low pressure compressor 44 and high pressure compressor 52 (shown in FIG. 1) or extracting foreign material from core flow path C. In this respect valve assembly 66 includes a movable member (not shown for clarity reasons) with a first position, wherein substantially all air traversing low pressure compressor 44 along core flow path C is communicated to high pressure compressor 52 (shown in FIG. 1), and a second position wherein at least a portion of air traversing low pressure compressor 44 is communicated as a bleed airflow D to the environment external to engine core case 100 through bleed air duct 64.

Figure 3:
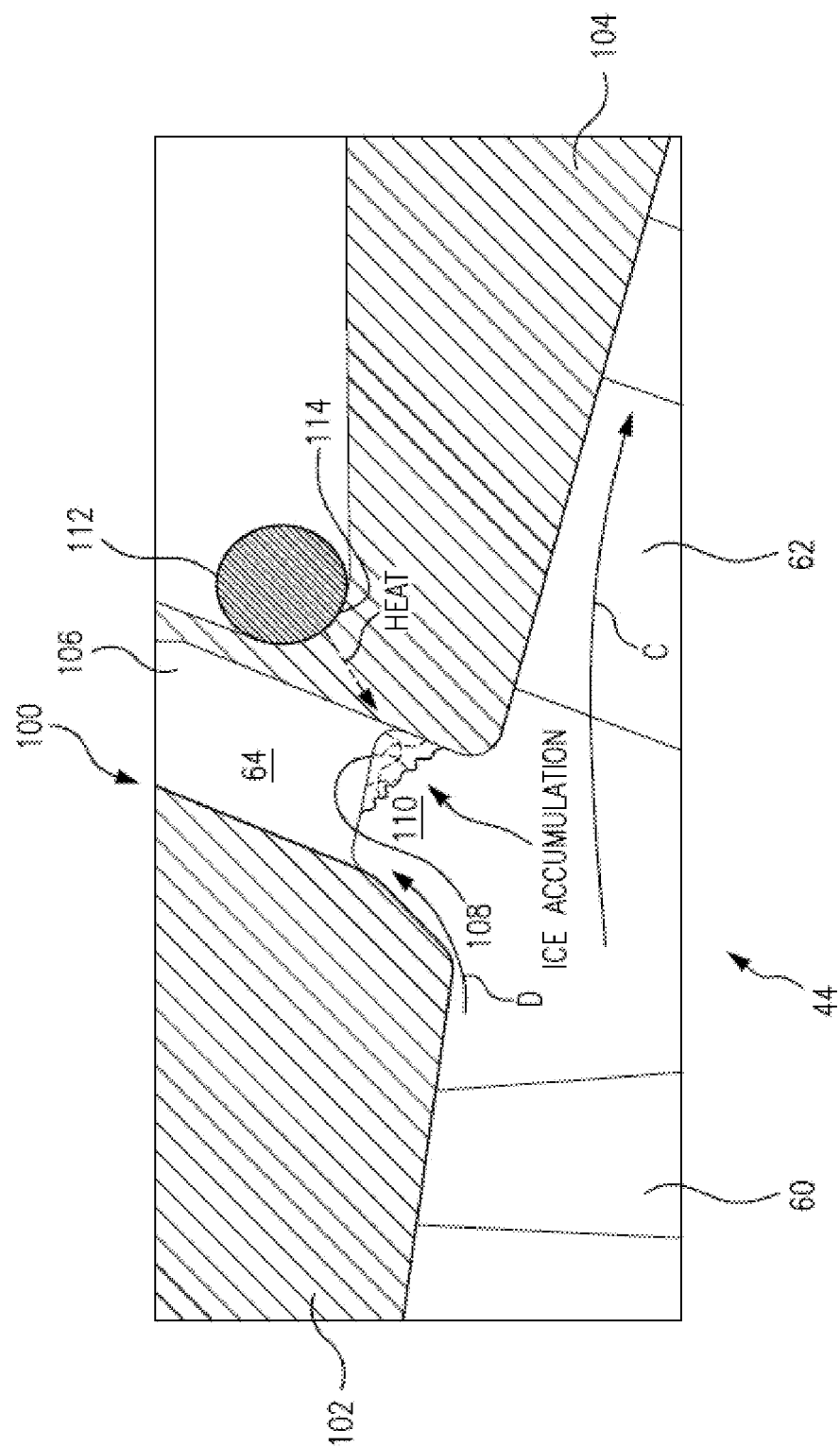
FIG. 3 is a cross-sectional view of a portion of another embodiment of a gas turbine, showing a lubricant conduit connected to an exterior of the engine case.

With reference to FIG. 3, engine core case 100 is shown. Engine core case 100 has a core case forward segment 102 and a core case aft segment 104 that define therebetween an annulus 110. Annulus 110 leads to a bleed air duct 64 and is spanned by a core case structural member 106. Core case structural member 106 couples core case forward segment 102 to core case aft segment 104. In embodiments, the structure-supporting member bounds circumferentially adjacent bleed air ducts. In certain embodiment, the structure-supporting member has an aerodynamically contoured surface. An aft-facing edge of forward core case segment forward 102, core flow path-facing surface 108, and forward-facing edge of core case aft segment 104 bound an inlet of bleed air duct 64. As illustrated, bleed air duct 64 is located at an axial engine station disposed between low pressure compressor 44 and high pressure compressor 52 (shown in FIG. 1), i.e. a bleed duct.

During engine operation in hail conditions, valve assembly 66 can be opened to extract hail ingested by gas turbine engine 20. In this respect, opening valve assembly 66 allows a portion of the air to form a bleed airflow D. Bleed airflow D exits engine core case 100 through bleed air duct 64 and generally passing ingested hail and other foreign material out of core flow path C. Hail impacting core flow path-facing surface 108 can lower the temperature of the surface. Engine operating conditions can lower the temperature of the surface sufficient such that hail and/or ice can accumulate on the core flow path-facing surface 108. The temperature drop can cause hail and ice extracted from the core to deposit on case structure adjacent to the entrance to bleed air duct 64. The size of the deposit can increase over time, and under certain conditions, the deposit can be dragged, for example, by air flowing through the case, back into core flow path C.

Engine core case 100 includes a lubricant conduit 112. With reference to FIG. 1, lubricant conduit 112 provides lubricant to an engine system, e.g. fan drive gear architecture 48, one or more bearing systems 38, or any other suitable source of heated lubricant. With continuing reference to FIG. 3, spent lubricant, that is lubricant which has removed heat from the system, traverses conduit 112 and flows across an aft exterior surface 114 of engine core case 100. As the spent lubricant traverses lubricant conduit 112, heat transfers from the heated lubricant and into core case 104. This cools the lubricant so that it may be reused in the lubrication circuit. It also heats core case aft segment 104. Core case aft segment 104 in turn transfers heat to core case structure-supporting member 106, warms core flow path-facing surface 108, and makes it more difficult for ice to accumulate on the surface. It is to be appreciated and understood that lubricant conduit 112 can, alternatively or additionally, be arranged such that it traverses a surface of core case forward segment 102 for purposes of conducting heat into the core case for heating surfaces that could accumulate hail and/or ice. In yet another alternative embodiment, the lubricant conduit 112 can, alternatively or additionally, be arranged such that it is located at another location of the bleed air duct 64 for example, proximate to an interface of a bleed air duct located within the fan bypass duct that exhausts to the atmosphere or to another region of the engine.

Figure 4:
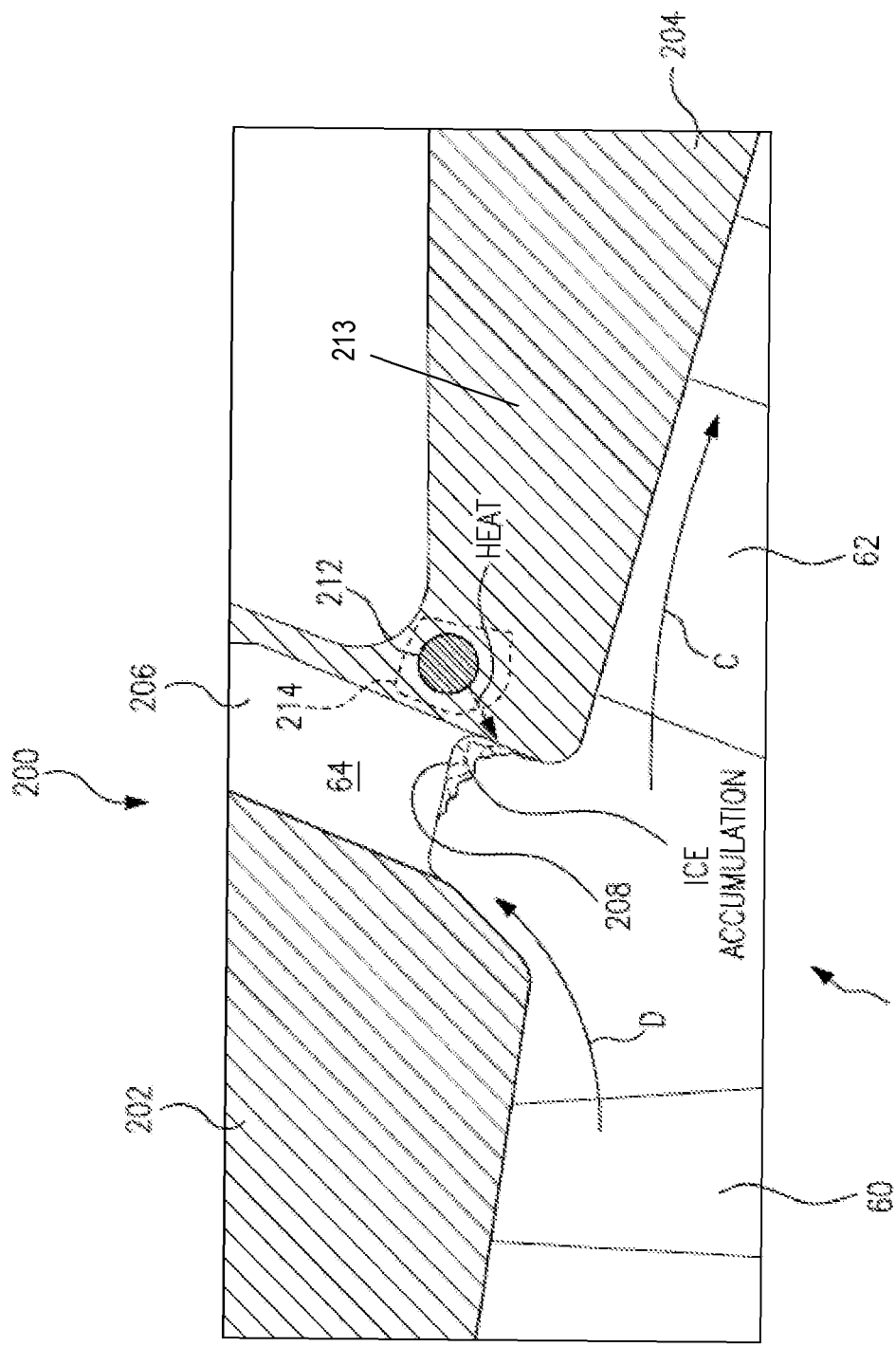
FIG. 4 is a cross-sectional view of a portion of an embodiment of a gas turbine engine, showing a lubricant conduit defined within a wall of the engine case.

With reference to FIG. 4, an engine core case 200 is shown. Engine core case 200 includes a first case surface and a second case surface defining a thickness of a wall 213 therebetween. Engine core case 200 is similar to engine core case 100 and additionally includes a lubricant conduit 212. Lubricant conduit 212 is defined within the thickness of the wall 213 of engine core case 200. Lubricant conduit 212 can include a manifold 214 in fluid communication with lubricant conduit 212 for distributing heating over core flow path-facing surface 208. It is contemplated that lubricant conduit 212 and/or manifold 214 (indicated is dashed outline) are integrally cast within engine core case 200. This positions the heated lubricant flow relatively close to interior surfaces prone to hail and/or ice collection, potentially making the heating more efficient. It is to be appreciated and understood that lubricant conduit 212 and or manifold 214 can be into core case forward segment 202 or case structure-supporting member 206 for heating core flow path-facing surface 208. In yet another alternative embodiment, the lubricant conduit 212 can, alternatively or additionally, be arranged such that it is located at another location of the bleed air duct 64 for example, proximate to an interface of a bleed air duct located within the fan bypass duct that exhausts to the atmosphere or to another region of the engine.

Figure 5:
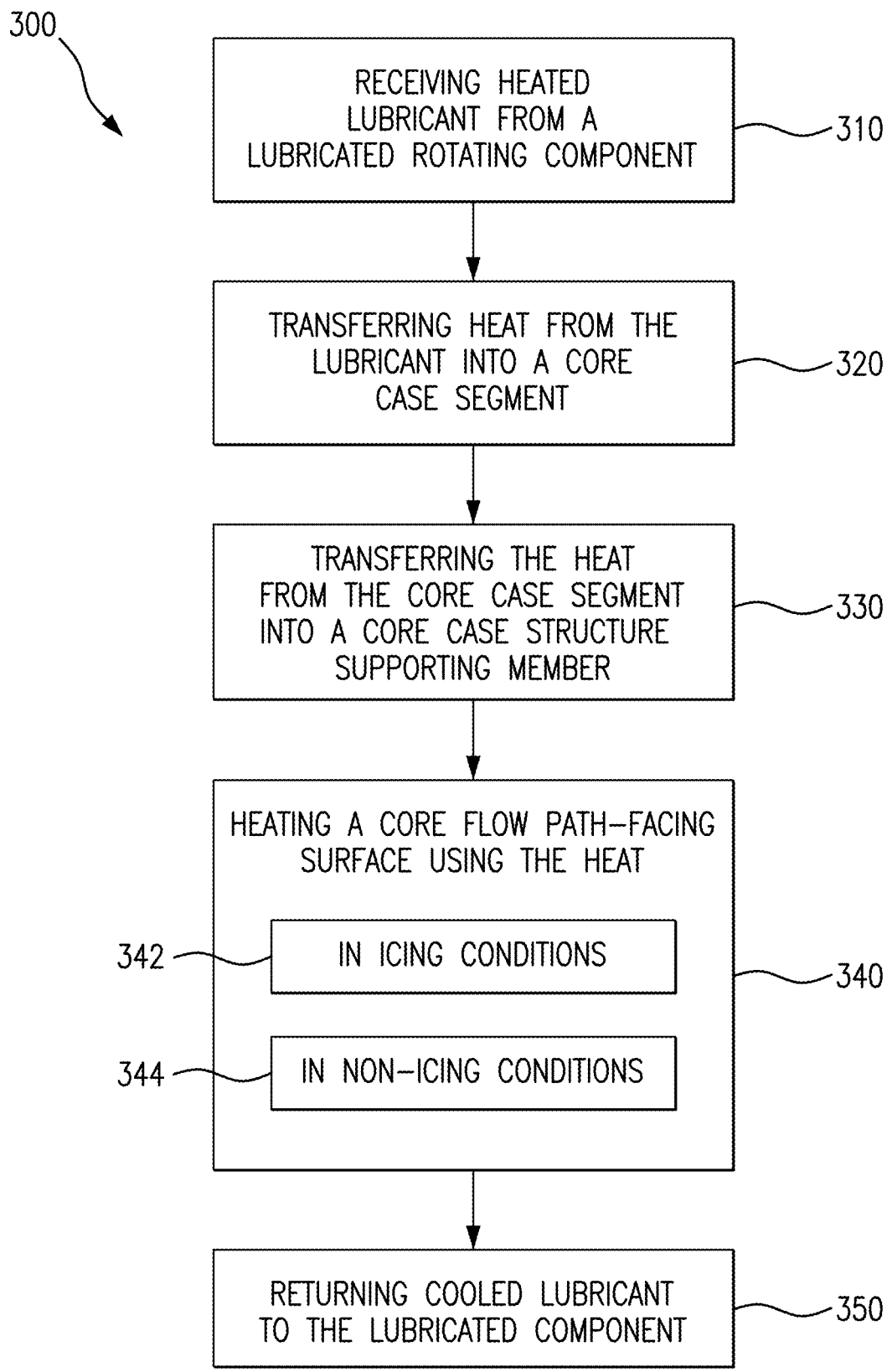
FIG. 5 is a method for heating a gas turbine engine case, schematically showing the method.
Figure 6:
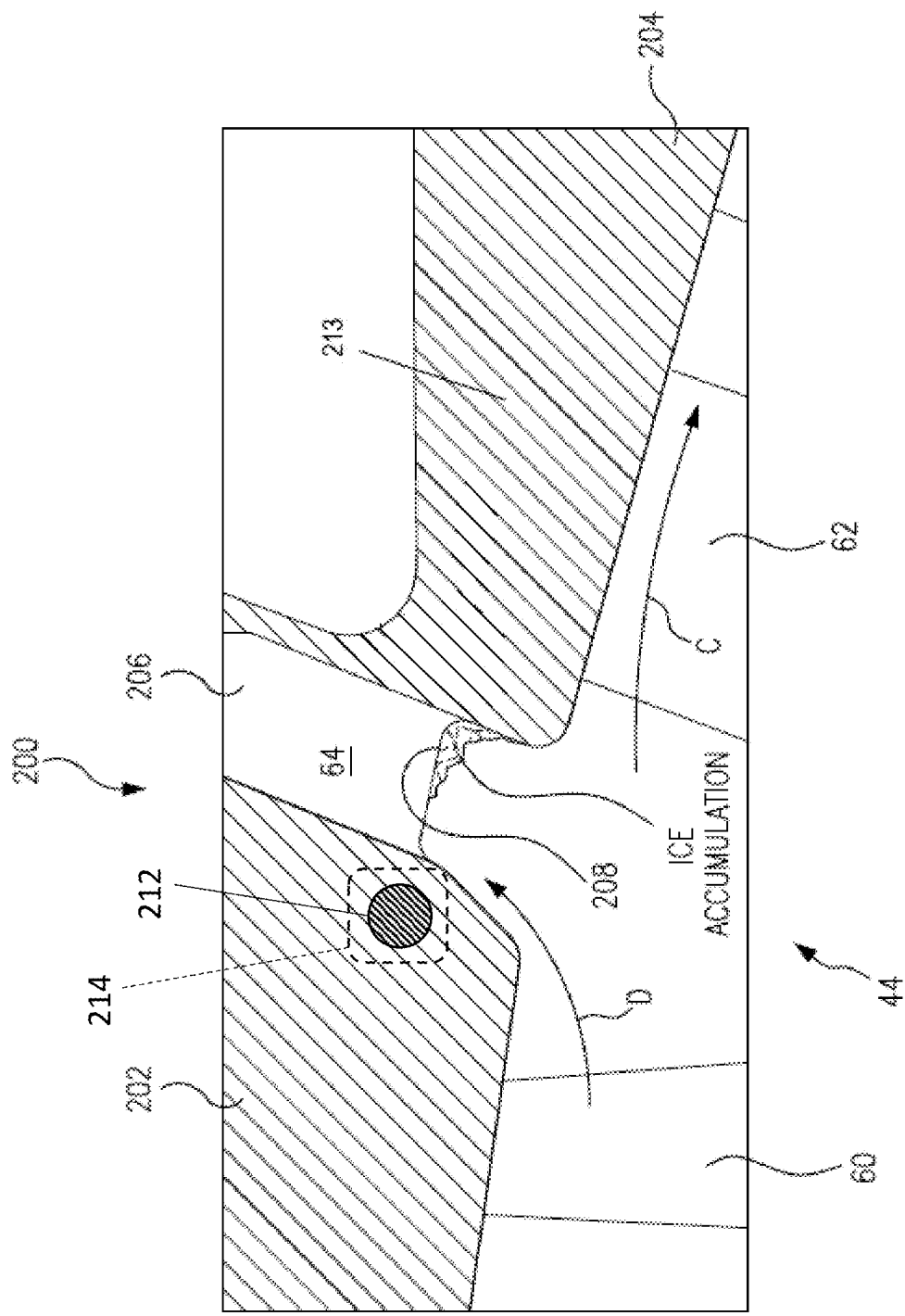
FIG. 6 is a cross-sectional view of a portion of another embodiment of a gas turbine engine, showing a lubricant conduit defined within a wall of the engine case.

With reference to FIG. 5, a method 300 of heating a gas turbine engine core case, e.g. engine core case 100, includes receiving a flow of heated lubricant, as indicated by box 310. Method 300 also includes transferring heat from the heated lubricant flow into a segment of a core case, e.g. core case 100 or 200, as indicated by a box 320. The heat can be transferred into a forward segment of the core case, an aft segment of the core case, and/or a structural member coupling the forward and aft case segments. Method 300 further includes transferring heat from the core case segment into the structure-supporting member coupled to case body aft segment, as indicated with box 330. Method 300 additionally includes heating a core flow path-facing surface of the structure-supporting member, as indicated by a box 340. Heating can be done while operating the gas turbine engine in icing conditions, as indicated with box 342, non-icing operating conditions, as indicated with box 344, or continuously during both icing and non-icing conditions.

It is contemplated that receiving the flow of heated lubricant can include receiving heated lubricant from a lubricated engine component. This can improve efficiency by applying waste heat to internal engine structures potentially prone to accumulating ice or hail during operation under certain conditions or environments. Method 300 can also include returning cooled lubricant to the lubricated engine component, potentially reducing the amount of cooled lubricant that the engine lubrication system otherwise needs to provide to the lubricated engine component. It is also contemplated that heating the core flow path-facing surface is a passive process, such as where lubricant cycles continuously through the lubricant conduit during engine operation without requiring operation of a valve or other flow control mechanism.

The methods and systems of the present disclosure, as described above and shown in the drawings, provide for gas turbine engines with superior properties including improved efficiency during operation in environments where hail or icing conditions can be encountered. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A case for a gas turbine engine, comprising:
a case body having a first case surface and a second case surface defining a case wall thickness therebetween, the case body including:
an axially extending core flow path;
a radially extending bleed air duct coupling the core flow path in fluid communication with the external environment;
a structure-supporting member spanning the bleed air duct; and
a lubricant conduit defined within the case wall thickness between the first case surface and the second case surface, and in thermal communication with the structure-supporting member, the lubricant conduit configured to convey spent, heated lubricant from one of a gear architecture or a bearing system of the gas turbine engine;
wherein the lubricant conduit is defined in one of a forward case body segment upstream of the bleed air duct relative to a direction of airflow along the core flow path or an aft case body segment downstream of the bleed air duct relative to the direction of airflow along the core flow path.

2. A case as recited in claim 1, wherein the lubricant conduit is in fluid communication with the gear architecture encased within the case body.

3. A case as recited in claim 1, wherein the lubricant conduit is in fluid communication with the bearing system encased within the case body.

4. A case as recited in claim 1, wherein the case body includes the aft case body segment connected to the structure-supporting member, wherein the lubricant conduit is in thermal communication with the structure-supporting member through an intervening portion of the aft case body segment or the forward case body segment.

5. A case as recited in claim 4, wherein the lubricant conduit includes a lubricant manifold defined within the aft case body segment.

6. A case as recited in claim 1, wherein the lubricant conduit is disposed forward, and radially outward relative to a core flow path-facing surface of the case body structure-supporting member.

7. A gas turbine engine, comprising:
a lubricated engine component;
a case body having a first case surface and a second case surface defining a case wall thickness therebetween, the case body encasing the lubricated engine component, the case body defining:
an axially extending core flow path;
a radially extending bleed air duct coupling the core flow path in fluid communication with the external environment;
a structure-supporting member spanning the bleed air duct; and
a lubricant conduit defined within the case wall thickness between the first case surface and the second case surface, and in thermal communication with the structure-supporting member, wherein the lubricant conduit is in fluid communication with the lubricated engine component, the lubricated engine component is one of a gear architecture or a bearing system, and wherein the lubricant conduit is configured to convey spent, heated lubricant from one of the gear architecture or the bearing system of the gas turbine engine;
wherein the lubricant conduit is defined in one of a forward case body segment upstream of the bleed air duct relative to a direction of airflow along the core flow path or an aft case body segment downstream of the bleed air duct relative to the direction of airflow along the core flow path.

8. A gas turbine engine of claim 7, wherein the gear architecture is disposed within the case body.

9. A gas turbine engine as recited in claim 7, wherein the bearing system is disposed within the case body.

10. A gas turbine engine as recited in claim 7, wherein the case body includes the aft case body segment connected to the structure-supporting member, wherein the lubricant conduit is in thermal communication with the structure-supporting member through a portion of the aft case body segment or the forward case body segment between the structure-supporting member and the lubricant conduit.

11. A gas turbine engine as recited in claim 10, wherein the lubricant conduit is defined within the aft case body segment or the forward case body segment and adjacent to the structure-supporting member.

12. A gas turbine engine as recited in claim 10, wherein the lubricant conduit includes a lubricant manifold defined within the aft case body segment or the forward case body segment.

13. A gas turbine engine as recited in claim 7, wherein the lubricant conduit is disposed aftward or forward, and radially outward relative to a core flow path-facing surface of the structure-supporting member.

* * * * *